Nov. 21, 1933.    G. T. ANDERSON    1,935,606

REVERSIBLE ELECTRIC MOTOR

Filed Feb. 20, 1932

INVENTOR
Gotfried T. Anderson
BY
ATTORNEYS

Patented Nov. 21, 1933

1,935,606

UNITED STATES PATENT OFFICE 1,935,606

REVERSIBLE ELECTRIC MOTOR

Gotfried T. Anderson, Rockford, Ill., assignor to Howard D. Colman, Rockford, Ill.

Application February 20, 1932. Serial No. 594,182

10 Claims. (Cl. 172—278)

This invention relates generally to reversible alternating current motors of the induction type and more particularly to a fractional horsepower motor in which shifting of the magnetic field is produced by the action of shading coils.

The object of the invention is to provide a motor of the above character having its shading coils mounted in a novel manner and adapted to be shifted mechanically from one side of the poles to the other to produce rotation of the rotor in one direction or the other selectively.

Other objects and advantages of the invention will become apparent from the following detailed description taken in connection with the accompanying drawing, in which Figure 1 is a perspective view of a motor embodying the features of the present invention.

Figure 1:
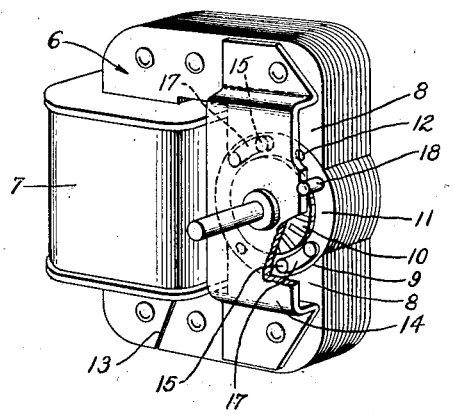

In the exemplary form shown in the drawing, the invention is embodied in a fractional horsepower motor of the two pole type having a substantially rectangular stator 6 with a primary winding 7 intended to be energized by alternating current enclosing one side leg of the stator. The other side leg provides two pole projections 8 having concave end faces 9 concentric with and spaced from the surface of a rotor 10 preferably of the squirrel cage type.

The motor poles are formed by the projections 8 cooperating with magnetic members in the form of plates of substantially uniform radial thickness disposed between the rotor surface and the end faces 9 and mounted for endwise movement circumferentially of the rotor. Herein the plates for the different poles are made rigid with each other and are formed by segmental portions of a tubular member 11 having an axial length substantially equal to the thickness of the stator 6 and composed of laminations in the form of rings of magnetic material secured together by pins 12. In the present instance, the surfaces 9 of the pole projections form a support permitting oscillation of the member 11, but it will be apparent that the same movement may be obtained with other types of supporting means.

Figure 4:
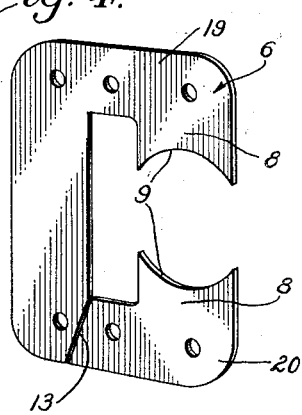
Fig. 4 is a perspective view of one of the stator laminations.

To form a rigid stator construction and at the same time permit the winding 7 to be preformed, the stator laminations are formed in two parts 19 and 20 fitting together along a line 13 (see Fig. 4) and the alternate laminations are assembled in inverted relation forming lapped joints at opposite ends of the winding. Bearing plates 14, secured at their opposite ends to the stator, provide journals for opposite ends of the rotor shaft and serve to maintain the member 11 in proper axial position.

Figure 5:
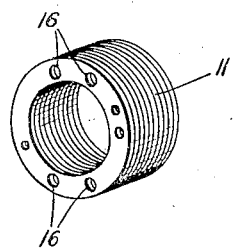
Fig. 5 is a perspective view of a part of the pole structure.

In the present instance, the shading coils for producing shifting of the magnetic field across the pole faces are in the form of single turn short-circuited rings 15 carried by the member 11 and disposed between the inner and outer surfaces thereof. To this end, each is composed of a U-shaped piece of copper wire having parallel legs projecting through longitudinally extending holes 16 (Fig. 5) in the member 11 and joined at their ends by a copper bar 17. For a purpose to appear later, the rings are constructed to have relatively low resistance, being formed in the present instance of No. 8 gage copper wire. The rings shown herein are of such size that the area of enclosed iron is approximately equal to one-third of the cross-sectional area of the projections 8.

It will be observed that the plane of the rings extends transversely of the projections 8 so that a portion of the flux threading longitudinally of the projections will pass through the rings. The annular spacing of the rings is such that for any position of the member 11, corresponding portions of the different poles will be shaded by the respective rings.

Figure 2:
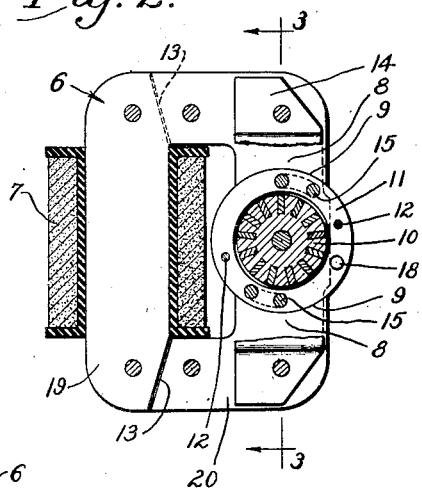
Fig. 2 is an actual size side view of the motor with certain of the parts broken away and shown in section.
Figure 3:
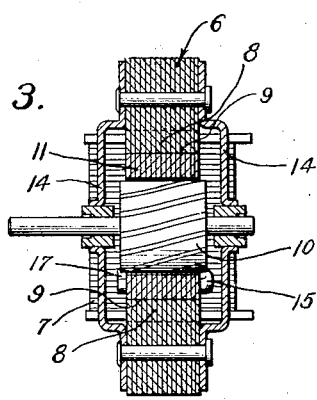
Fig. 3 is a sectional view taken along the line 3—3 of Fig. 2.

From the well known action of shading rings in motors of the present type, it will be understood that the magnetic flux entering the rotor iron from the portions of the member 11 enclosed by the rings will lag behind that threading the rotor from the other portions of the member. In this way, the magnetic field across the pole faces will shift in a counter-clockwise direction when the winding 7 is energized with the member 11 positioned as shown in Fig. 1 thereby causing the rotor to turn in the same direction. As the member is shifted clockwise from the position shown in Fig. 1, the torque produced by the motor decreases until the rings pass beyond the centers of the poles when the torque begins to increase, reaching its maximum value when the rings 15 are positioned on the other side of the pole as shown in Fig. 2. In this latter position, the rotor will turn in a clockwise direction when the winding 7 is energized.

Shifting of the member 11 to reverse the direction of rotation of the rotor may be effected conveniently through the medium of a pin 18 projecting rigidly from the member 11 parallel to the rotor axis. Engagement of the pin with one side edge of the bearing plate 14 may serve to limit the swing of the member to the two positions shown in Figs. 1 and 2 in which positions the shift-rings 15 are most effective in producing rotation of the rotor in opposite directions.

With the member 11 constructed as above described, it will be apparent that for either limit position of the member, a segment thereof is disposed between the shaded side tip of one pole and the unshaded side tip of the opposite pole, such segment being moved to a position opposite one of the projections 8 as an incident to shifting of the member to reverse the direction of rotation. In this way, no air gap or other reluctance section is interposed in the flux path through the poles which therefore remain of uniform iron cross-section for all positions of the member 11. The same output of the motor is therefore attained in either direction of rotation.

In addition to the function above mentioned, the segmental portions of the member 11 which are disposed between the adjacent side tips of th poles form magnetic extensions of the unshaded side tips with their inner surfaces closely following the rotor contour. Accordingly the range of distribution of the predominating unshaded flux component to the rotor iron is enlarged, contributing materially to the high output of the motor. No substantial leakage of the flux directly to the opposite pole occurs owing to the opposition to such leakage which is offered by the relatively high magneto-motive force produced by the high currents induced in the rings 15 when the latter are made of relatively low resistance as above described.

From the foregoing, it will be apparent that I have provided a simple arrangement for rendering motors of the class described mechanically reversible without materially decreasing the output thereof. This is due primarily to the manner of mounting the shading rings by which arrangement the air gap around the rotor is maintained of narrow width and proper distribution of the unshaded flux is made possible.

I claim as my invention:

1. A reversible alternating current motor combining a rotor, a stator adapted to be excited by alternating current and forming a rigid frame providing a plurality of pole projections, having end surfaces spaced from and facing the surface of said rotor, a member movable with respect to said frame and having magnetic sections disposed between said end surfaces and said rotor, a shading ring for each of said projections carried by said member and shiftable with the member to shade opposite side portions of the pole formed by any one of said projections and the opposing portion of said member, a bearing plate rigidly secured to said frame and rotatably supporting one end of said rotor, and a projection on said member cooperating with stop surfaces on said plate to limit the movement of said member to positions where said rings are most effective in producing rotation of said rotor in one direction or the other.

2. A reversible alternating current motor combining a stator providing two opposed pole projections and a winding for creating magnetic flux threading said projections, a tubular member of ring-shaped cross-section composed of magnetic material and rotatably mounted between the ends of said projections, a rotor rotatably mounted in the recess defined by the internal cylindrical surface of said member, and two short-circuited rings mounted on said member on diametrically opposite sides thereof and disposed wholly between the inner and outer surfaces of the member, said member being shiftable in opposite directions to cause said rings to shade different side portions of said poles.

3. A reversible alternating current motor combining a cylindrical rotor, a stator providing a plurality of pole projections having end surfaces spaced from the rotor surface and annularly spaced therearound, a magnetic member of substantially uniform thickness extending around said rotor between said end surfaces and said rotor, and a plurality of shading rings one for each of said poles carried by said member and annularly spaced around the member so as to shade corresponding side portions of their respective poles, the segmental portions of said member between adjacent poles forming ferromagnetic connections between the shaded side tip of one pole and the adjacent unshaded side tip of another pole.

4. A reversible alternating current motor combining a cylindrical rotor, a stator adapted to be excited by alternating current and providing a pole projection having a concave end surface concentric with the rotor axis, a curved plate of magnetic material mounted between said end surface and the rotor surface for movement transversely of said projection and circumferentially of said rotor, a single turn shading ring disposed between opposite surfaces of said plate and having two opposite side portions projecting through said plate parallel to the rotor axis, said plate cooperating with said projection to form a pole different side portions of which are shaded by said ring depending on the relative positions of said plate and projection.

5. A reversible alternating current motor combining a cylindrical rotor, a stator adapted to be excited by alternating current and providing a pole projection having a concave end surface concentric with the rotor axis, a curved plate of magnetic material mounted between said end surface and the rotor surface for movement transversely of said projection and circumferentially of said rotor, a single turn shading ring disposed in the plane of said plate and shiftable with the plate from one side of said projection to the other whereby to produce shifting of the magnetic field in opposite directions across the pole formed by said plate and projection, one end portion of said plate projecting beyond one side of said projection when the ring is disposed opposite the adjacent side portion of the projection and being disposed between the projection and the rotor when the ring is opposite the opposite side portion of the projection.

6. In an alternating current motor, the combination of a stator adapted to be energized by alternating current and providing a pole projection, a rotor disposed adjacent the end of said projection, a magnetic member interposed between said rotor and the end of said projection and mounted for movement transversely of said projection, said member and said projection forming a pole having a face partially enclosing said rotor, and a shading coil mounted on said member and enclosing a section thereof threaded by magnetic flux threading longitudinally of said projection whereby the direction of rotation of said rotor is determined by the position of said member.

7. In an alternating current motor, a rotor, a stator adapted to be excited by alternating current and providing a pole defining a face partially surrounding said rotor, said pole being composed of relatively movable magnetic parts, and a shading ring enclosing a portion of the sectional area of the pole and mounted upon the part of said pole adjacent said rotor whereby the shading ring encloses one side portion or the other of said pole depending upon the relative positions of said parts.

8. In an alternating current motor, a rotor, a stator adapted to be excited by alternating current and providing a pole defining a face partially surrounding said rotor, said pole being composed of relatively movable magnetic parts, a shading ring mounted on the part adjacent said rotor and shiftable relative to the pole by relative movement between said parts, and means for limiting relative movement between said parts in opposite directions to positions in which said ring is most effective in producing rotation of said rotor in opposite directions.

9. In a motor of the class described, the combination of a rotor, a magnetic pole composed of two parts movable relative to each other in a direction transversely of the pole, and a shading member carried by the part adjacent said rotor and arranged to shade one side or the other of the pole depending upon the relative positions of the parts.

10. In a motor of the class described, the combination of a rotor, a plurality of pole projections spaced around said rotor and having end portions adjacent the rotor arranged for lateral shifting relative to the remainder of the projections, a shading coil on each of said end portions, and means rigidly joining said end portions to permit bodily shifting of said coils from one side of their respective poles to the other, said last mentioned means following closely the rotor surface and forming a magnetic connection between the adjacent side tips of the adjacent poles.

GOTFRIED T. ANDERSON.